United States Patent [19]
Wada et al.

[11] Patent Number: 4,827,339
[45] Date of Patent: May 2, 1989

[54] MOVING PICTURE SIGNAL TRANSMISSION SYSTEM

[75] Inventors: Masahiro Wada, Tokyo; Hirohisa Yamaguchi, Tanashi; Hideo Yamamoto, Sagamihara, all of Japan

[73] Assignee: Kokusai Denshin Denwa Co., Ltd., Tokyo, Japan

[21] Appl. No.: 117,169

[22] PCT Filed: Aug. 15, 1986

[86] PCT No.: PCT/JP86/00422
§ 371 Date: Sep. 22, 1987
§ 102(e) Date: Sep. 22, 1987

[87] PCT Pub. No.: WO87/05180
PCT Pub. Date: Aug. 27, 1987

[30] Foreign Application Priority Data
Feb. 20, 1986 [JP] Japan .................................. 61-33782

[51] Int. Cl.[4] ........................ H04N 7/12; H04N 7/18; H04N 7/14
[52] U.S. Cl. .................................. 358/136; 358/105; 358/85; 379/202
[58] Field of Search .................. 358/135, 136, 105, 85, 358/260; 379/202

[56] References Cited
U.S. PATENT DOCUMENTS

| 4,077,053 | 2/1978 | Ishijuro | 358/136 |
| 4,571,618 | 2/1986 | Hatori et al. | 358/136 |
| 4,633,326 | 12/1986 | Endoh et al. | 358/260 |
| 4,656,523 | 4/1987 | Mizutani | 358/260 |
| 4,703,348 | 10/1987 | Yuasa et al. | 358/135 |
| 4,704,628 | 11/1987 | Chen et al. | 358/136 |
| 4,710,813 | 12/1987 | Wallis et al. | 358/136 |

Primary Examiner—John K. Peng
Attorney, Agent, or Firm—Armstrong, Nikaido Marmelstein & Kubovcik

[57] ABSTRACT

Moving picture signal transmission system, wherein the data-compression is effected for the moving picture by the intraframe-encoding and the interframe-encoding, the signal is divided into the fixed frame-length transmission frame, the transmission frame has the header (A, B, C) which identifies whether it is the first transmission frame, the middle transmission frame or the last transmission frame in one picture frame signal, and then the transmission frame is transmitted, a receiver informs a transmitter of the validity of the received sequence and the result of the error check, when a transmitter receives the error message from a receiver, the picture frame immediately after the message is encoded by only the intraframe-encoding, the succeeding frames are encoded through interframe-encoding, so that the influence of the error is removed within a short time.

1 Claim, 5 Drawing Sheets

MOVING PICTURE SIGNAL TRANSMISSION SYSTEM

FIELD OF THE INVENTION

The present invention relates to a moving picture signal transmission system which divides the high efficiency encoded variable length digital moving picture signal into fixed length transmission frames, in particular relates to, and more particularly relates to such a transmission system which is able to recover the normal operation in a short amount of time when there is an error in transmission, and the loss of a transmission frame synchronization occurs.

BACKGROUND OF THE INVENTION

By the development of the moving picture communication such as a video conference, a video telephone and others, it is strongly desired to transmit the moving picture through the low bit rate digital channel. It is important for the technology to realize this requirement to encode the picture signal with high efficiency, and to transmit the encoded signal.

The high efficiency encoding system of the picture signal is classified into the intraframe-encoding system and the interframe-encoding system. The moving picture signal is considered a series of still pictures which are called picture frames of 25 through 30 frames per second. The intraframe-encoding system encoded by using only the data in the present picture frame, when any picture frame is encoded, and it is the interframe-encoding system that encodes by using the data of the present picture frame and the data of the previous frame.

When the receiver in this system decodes the encoded signal which is received from the transmitter, and reproduces the picture frame, the intraframe-encoding system can be decoded using only the data of encoded picture frame itself. On the other hand, it is necessary for the interframe-encoding system to decode the frame data using not only the present frame but also the preceeding picture frame.

Further, when an error of transmission occurs, only one frame is affected by the error of the transmission in the intraframe-encoding system. On the other hand, all succeeding frames are affected by the error of transmission in the interframe-encoding system. Accordingly, the normal decoding operation can not continue. To overcome the disadvantages of that interframe-encoding system, the picture frame is transmitted by the intraframe-encoding system when the error of transmission occurs, and then it is necessary to return from that system to the interframe-encoding.

The picture of the video conference, the video telephone and others are comparatively low in movement of a picture between successive frames. For those pictures, the interframe-encoding system is advantageous so that a high compression ratio is obtained. Accordingly, it is important that the system is quickly recovered when an error occurs.

A prior transmission system uses the fixed length transmission frame, in which the contents of the frame are identified by the header attached to the frame. But, in order to divide the variable length moving picture frame that is encoded by intraframe-encoding system or interframe-encoding system into the fixed length transmission frames, the aforementioned prior transmission system is not sufficient. It is necessary that the transmission system has the following: (1), the transmission efficiency for the moving picture signal is very high (compression ratio must be high); (2), If the error of transmission frame, the loss of transmission frame synchronization, and other errors occur, the system must recover in a short time. Further, it is necessary to be able to transmit other digital signals, for example, voice, still picture, data and others, together with the main moving picture signal. Accordingly, it is important for the proposed transmission system to be able to simply provide the multiplication of the signals.

SUMMARY OF THE INVENTION

For considering the present situation of the above prior art, the transmission system which transmits the transmission frame of a fixed length obtained by dividing the digital moving picture signal of the high quality encoded of the variable length, the object of the present invention is to provide a moving picture signal transmission system in which the transmission efficiency is excellent, and which has the characteristics to quickly recover to a normal state, and to quickly remove the influence of error of the transmission frame, the loss of transmission frame synchronization occurred by error of transmission signal.

The feature of the present invention is to add the header for identifying the first transmission frame, the middle transmission frame and the last transmission frame for a particular picture frame in a transmitter, and to realize a moving picture signal transmission system in which the transmission efficiency is excellent, and to have the high operational reliability by removing the influence in a short time when the error of transmission frame, the loss of transmission frame synchronization occurs, so that a receiver checks the validity of the transmission frame by the added header, and inform the occurrence of the error to the transmitter.

PREFERRED EMBODIMENTS OF THE INVENTION

Figure 1:
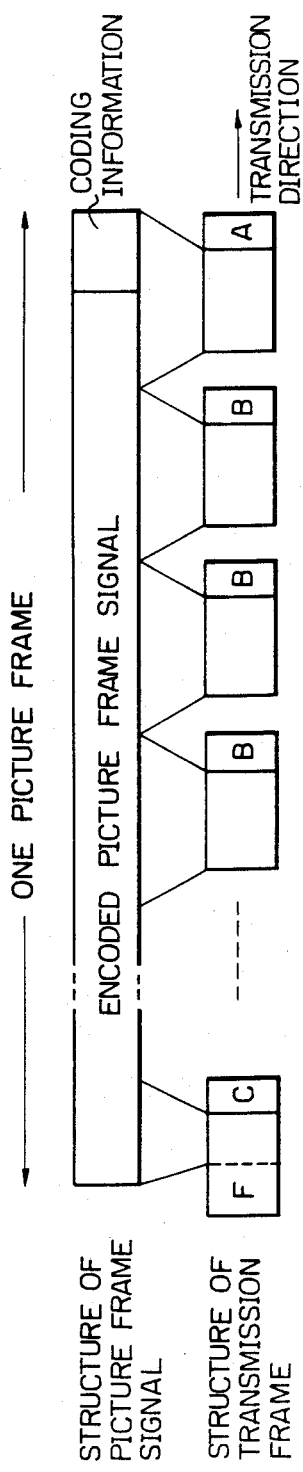
FIG. 1 is a diagram illustrating the composition and the mutual relation between the picture frame signal and the transmission frame in the present invention.

FIG. 1 shows the composition and the mutual relation between the encoded digital moving picture signal (one picture frame) and the transmission frame. One picture frame is the variable length frame that is composed of the encoded picture frame signal which follows the head. This head is the coding information which shows whether it is in the intraframe-encoding system or the interframe-encoding system. This picture frame is divided into the unit length of transmission frame which has a fixed length, each of the transmission frames are added with the identification header as shown in the following table.

TABLE 1

| position in the picture frame | identification header |
|---|---|
| first transmission frame | A |
| middle transmission frame | B |
| last transmission frame | C |

In FIG. 1, F is the fill bit for adjusting the bit length in the last transmission frame since the picture frame signal is a variable length.

Figure 2:
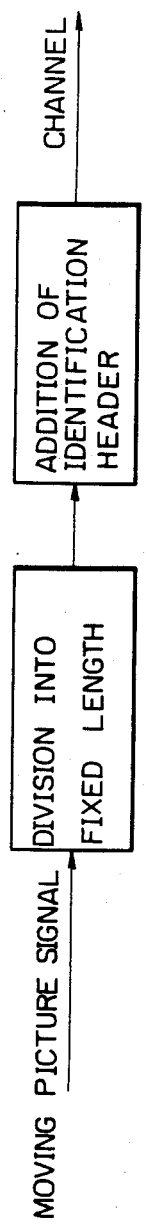
FIG. 2 is a diagram illustrating the process of signal processing in the transmitter.

FIG. 2 shows the flow of process in the transmitter. The moving picture signal is divided into a fixed length for each picture frame, and is added with the identification header, and then, the moving picture signal is output to the channel for the transmission frame.

Figure 3:
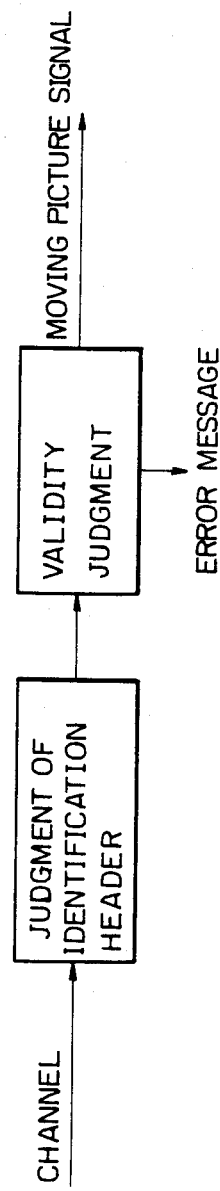
FIG. 3 is a diagram illustrating the process of signal processing in the receiver.

FIG. 3 shows the flow of process in the receiver. The identification header of the transmission frame received from the channel is first tested. From the result of the test the validity judgment, as describe later, is carried out using a classification of the identification header and coding information which is contained in the frame which has identification header A. As the result, when the received frame is normal, signal parts except the header are taken out as the received frame for the moving picture signal. On the other hand, when the received frame is incorrect the receiver transmits the error occurring message to the transmitter, and stops decoding the moving picture signal.

Now the validity judgment in the receiver is described in detail.

Figure 4:
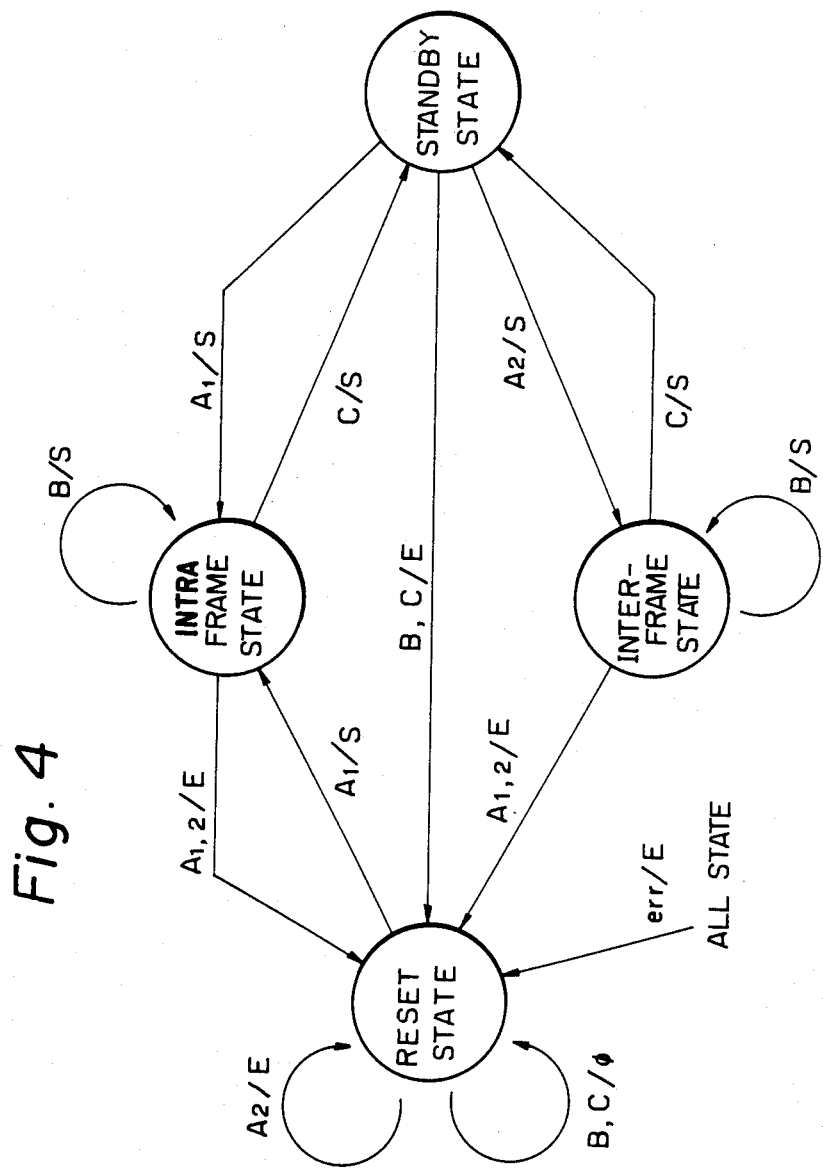
FIG. 4 is a diagram illustrating the state transition of the validity judgment operation for the received transmission frame in the receiver, FIGS. 5 (a) and (b) is a diagram illustrating one example of the hardware for realizing the present system.

FIG. 4 is a diagram illustrating the state transition of the validity judgment operation. Referring to this figure, a circle indicates the state, and an arrow indicates the flow direction. A sign X/Y added the flow indicates to carry out the operation Y when a state transition factor X occurs. In a state transition factor of the state flow, $A_1$ means the receipt of the first transmission frame of the intraframe-encoded picture frame signal, $A_2$ means the receipt of the first transmission frame of the interframe-encoded picture frame signal, B means the receipt of the middle transmission frame of picture frame signal, C means the receipt of the last transmission frame of picture frame signal and err means the detection of any transmission error. Further, S means the operation for taking out the signal parts of the received transmission frame for the moving picture signal, E means the operation for informing the error message and $\phi$ means that it does not operate anything.

The initial state is a reset state, thus, when $A_1$ is received, the state transmits to the intraframe-state which decodes the intraframe-encoded signal. At the same time, the signal part of the transmission frame is taken out as a moving picture signal. On the other hand, when $A_2$ is received, the error message is transmitted, and the receiver asks the transmitter to send the intraframe-encoded moving picture frame signal, since the interframe-encoded signal can not be decoded in this state. Further, when B or C is received, the receiver does not operate anything. When B is received in the intraframe state, the receiver takes out the moving picture signal, and the state does not change. Moreover, when C is received, the receiver takes out the moving picture signal, and the state transits to the standby state of the next picture frame as the receipt of one picture frame signal is completed. Further, when $A_1$ or $A_2$ is received, the receiver transmits the error message, and the state changes to a reset state since the next picture frame signal reaches before the receipt of one picture frame signal is completed. When $A_1$ or $A_2$ is received in the standby state, the state changes to the intraframe-state, or the interframe-state respectively, after the receiver takes out the moving picture signal. Moreover, when B or C is received, the receiver transmits the error message, and the state changes to the reset state. In the interframe-state for decoding the interframe-encoded signal, the same operation and transition as the intraframe-state are carried out. Further, when the transmission error is detected by any other check, the receiver transmits the error message, and the state returns to the reset state from any state.

Figure 5A:
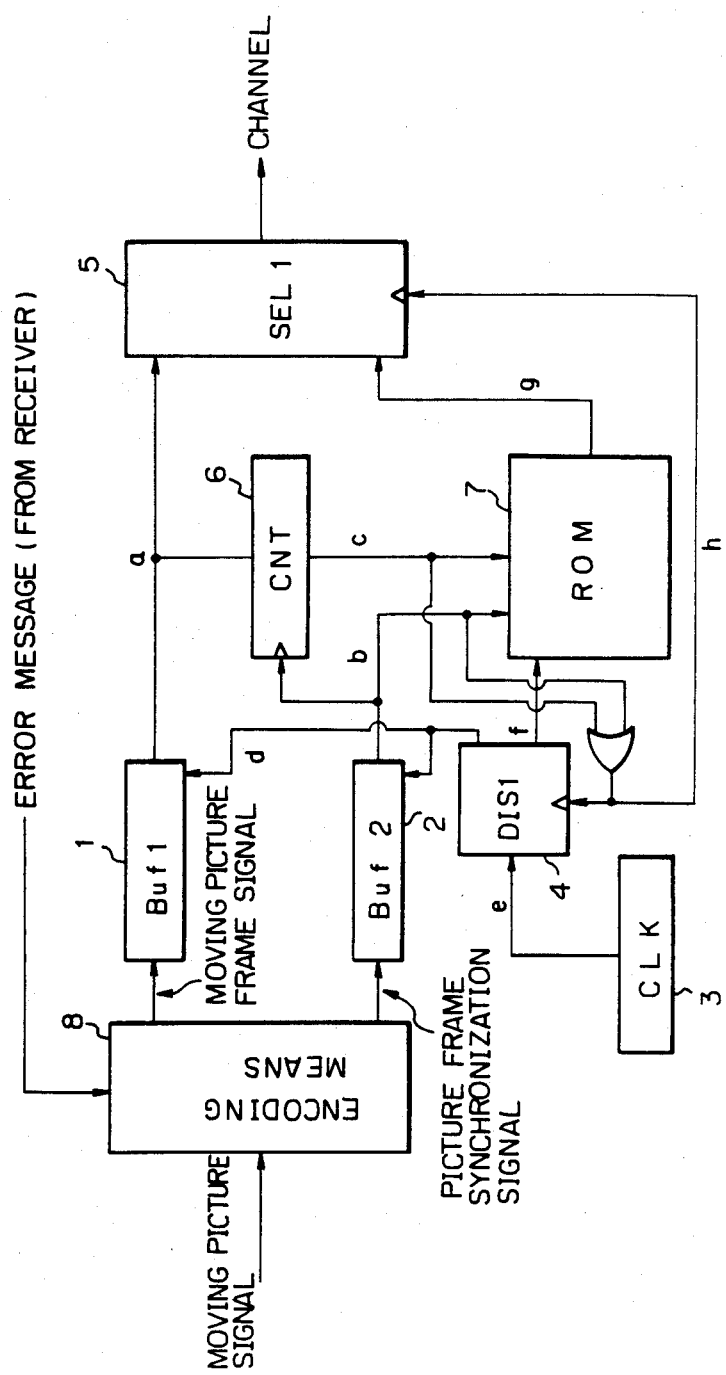
Figure 5B:
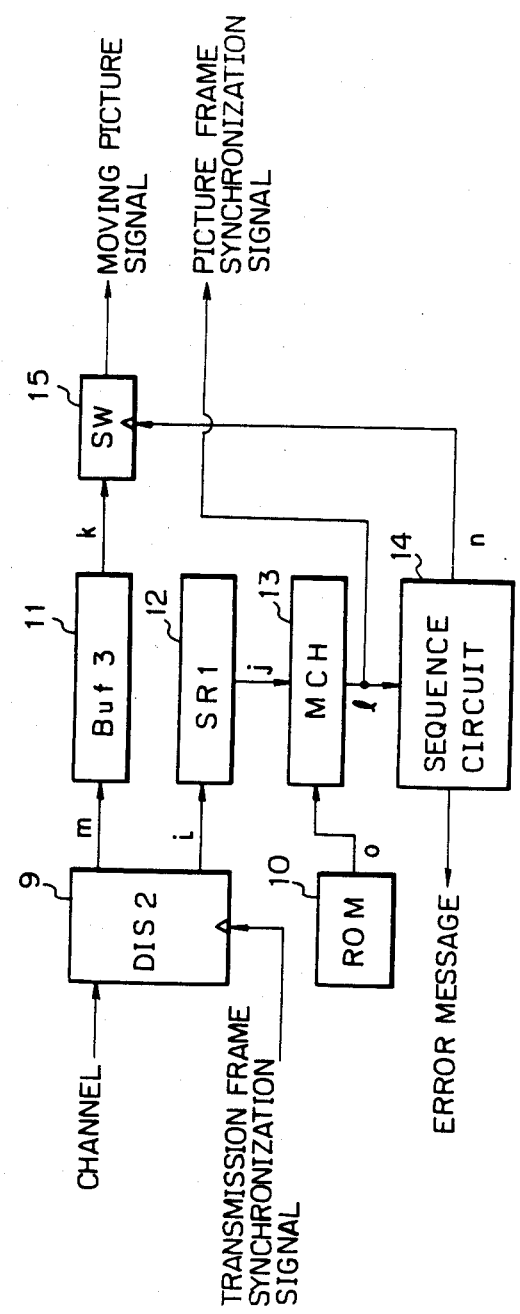

FIG. 5 shows one example of hardware for realizing the present system. First, the operation in the transmitter is described. The encoded moving picture frame signal has the picture frame synchronization signal which shows the timing of picture frame, and is applied to the picture frame signal buffer (Buf 1) 1, and to the picture frame synchronization signal buffer (Buf 2) 2, respectively. These two buffers are mutually synchronized in both write timing and read timing with each other. The clock signal (e) from the clock generator (CLK) 3 is applied as the read clock (d) to the (Buf 1) 1 and the (Buf 2) 2 through the clock distributor (DIS 1) 4. Two buffers are read out by this clock, the read out moving picture frame signal (a) is transmitted to the channel through the signal selector (SEL 1) 5. Further, the moving picture frame signal (a) is counted by the counter (CNT) 6, and when the signal (a) reaches the predetermined length of the transmission frame, the synchronization signal (c) of the transmission frame turns to active. The clock distributor (DIS 1) 4 and the signal selector (SEL 1) 5 are switched by this signal (c), the clock signal (e) is applied to the read only memory (ROM) 7 as the read clock (f), and the signal (g) read out from the read only memory (ROM) 7 is transmitted to the channel through the signal selector (SEL 1) 5. The read only memory (ROM) 7 stores the patterns of the identification header, and the header which indicates the middle transmission frame of one picture frame signal is read out by the transmission frame synchronization signal (c). When the identification header is read out, the signal selector (SEL 1) 5 and the clock distributor (DIS 1) 4 return to the original state. The above operation is repeated in the transmission frame cycle.

When the transmission frame comes close to the end of the picture frame signal, the picture frame synchronization signal (b) read out of the buffer 2 turns to active. The signal selector (SEL 1) 5 and the clock distributor (DIS 1) 4 change to the side of the read only memory (ROM) 7 by this signal (b), and the identification header which indicates the last transmission frame of one picture frame signal is transmitted to the channel. After the reading of the identification header is completed, the signal selector (SEL 1) 5 and the clock distributor (DIS 1) 4 return to the original state, and the rest of the signal of one picture frame signal is read out. When this reading is completed, the picture frame synchronization signal (b) turns to active, the signal selector (SEL 1) and the clock distributor (DIS 1) 4 change to the side of the read only memory (ROM), and the fill bit pattern stored in this memory is read out in order to adjust the transmission frame length. Afterwards, the identification header which indicates the first transmission frame of one picture frame signal is read out of the read only memory (ROM) 7, and the system begins to transmit the next picture frame signal.

As describe later, when the error message is received, the encoding means 8 is forced to intraframe-encoding mode for one picture frame by the error message, and the succeeding picture frame is encoded in interframe-encoding mode.

Next, the operation in the receiver is described. The transmission frame received from the channel is separated into the moving picture signal parts (m) and the identification header parts (i) in the signal distributor (DIS 2) 9 by the transmission synchronization signal, signal parts (m) is applied to the receive buffer (Buf 3) 11, and the signal parts (i) is applied to the shift register (SR 1) 12. The contents (j) of the identification header applied to the shift register (SR 1) 12 is compared with the header pattern (o) stored in the read only memory (ROM) 10 at the bit pattern comparator (MCH) 13, and the contents (j) is identified.

The results (l) of the identification operates as the picture frame synchronization signal that shows the position of the moving picture signal stored in the receiving buffer (Buf 3) 11 among one picture frame signal. At the same time, the results (l) of the identification is applied to the sequence circuit 14. This sequence circuit is the circuit to operate the state transition which is shown in FIG. 4, and carries out the validity judgment of the received transmission frame. Then, when the error occurs, the error message is transmitted. On the other hand, when the error does not occur, the signal (n) turns to active, and the switch (SW) 15 is closed, and the contents (k) of the receive buffer (Buf 3) 3 are output as the moving picture signal. When the error occurs, the signal (n) does not turn to active, and the switch (SW) 15 opens as it is. Accordingly the contents of the receiving buffer (Buf 3) 11 are discarded.

APPLICATION TO INDUSTRIES

As described above, the present transmission system which transmits the digital moving picture signal with high efficient coding by dividing it into the transmission frames of the fixed length, and when the transmission error, the loss of the transmission frame synchronization occurs, it is possible to realize the moving picture signal transmission system which is excellent in the transmission efficiency, has the operational reliability to remove the influence of error in a short time.

The present invention is able to be utilized in a video conference and a video telephone.

We claim:

1. A moving picture signal transmission system, comprising:
    a transmitter; and
    a receiver,
    wherein said transmitter comprises,
    an encoding means (8) for encoding a picture signal through intra-frame encoding for a picture signal immediately after receiving an error message from a receiver, and through inter-frame encoding for other picture signals,
    a ROM (7) for storing predetermined identification headers (A,B,C) for a first transmission frame, a middle transmission frame, and a last transmission frame, respectively,
    a buffer (1) coupled with an output of said encoding means (8) for storing an encoded picture signal,
    a selector (5) for transmitting either an output of said buffer (1) or an output of said ROM (7),
    a counter means (6) coupled with an output of said buffer (1) for counting moving picture frame signal (a) and inserting said identification headers (A,B,C) in a transmission signal for every fixed frame length of a picture signal by switching said selector (5), and
    wherein said receiver comprises,
    a buffer (11) for storing received picture signal,
    a shift register (12) for storing received identification header (A,B,C),
    a ROM (10) for storing predetermined identification headers (A,B,C),
    a pattern comparator means (13) for comparing received identification headers in said shaft register (12) with predetermined identification headers in said ROM (10),
    a sequence circuit means (14) coupled with output of said pattern comparator (13) for checking validity of state transition of received identification headers, said sequence circuit (14) having a pass output of said buffer (11) as a received picture signal when no error in validity check is detected, and having a stop output of said buffer (11) and forwarding an error signal to a transmitter when an error is detected in said validity check.

* * * * *